United States Patent [19]

Werner et al.

[11] 4,086,908
[45] May 2, 1978

[54] PERFORATED HEAT TRANSFER SHEET

[75] Inventors: Frank D. Werner, Box SR9, Jackson, Wyo. 83001; Richard C. Greig, Jackson, Wyo.

[73] Assignee: Frank D. Werner, Jackson, Wyo.

[21] Appl. No.: 694,338

[22] Filed: Jun. 9, 1976

Related U.S. Application Data

[63] Continuation-in-part of Ser. No. 590,052, Jun. 25, 1975, abandoned.

[51] Int. Cl.² ............................................. F24J 3/02
[52] U.S. Cl. .............................. 126/270; 29/163.5 R
[58] Field of Search ............... 126/270, 271; 237/1 A; 29/191.4, 163.5

[56] References Cited

U.S. PATENT DOCUMENTS

| | | | |
|---|---|---|---|
| 2,680,437 | 6/1954 | Miller | 126/270 |
| 2,931,578 | 4/1960 | Thompson | 126/270 |
| 3,279,043 | 10/1966 | Wirt | 29/191.4 |
| 3,863,621 | 2/1975 | Schoenfelder | 126/270 |
| 3,875,925 | 4/1975 | Johnston | 126/270 |

*Primary Examiner*—Kenneth W. Sprague
*Attorney, Agent, or Firm*—Dugger, Johnson & Westman

[57] ABSTRACT

A highly efficient, low cost, heat transfer sheet providing for transfer of heat from the sheet to a fluid and finding particular use in solar collectors.

12 Claims, 8 Drawing Figures

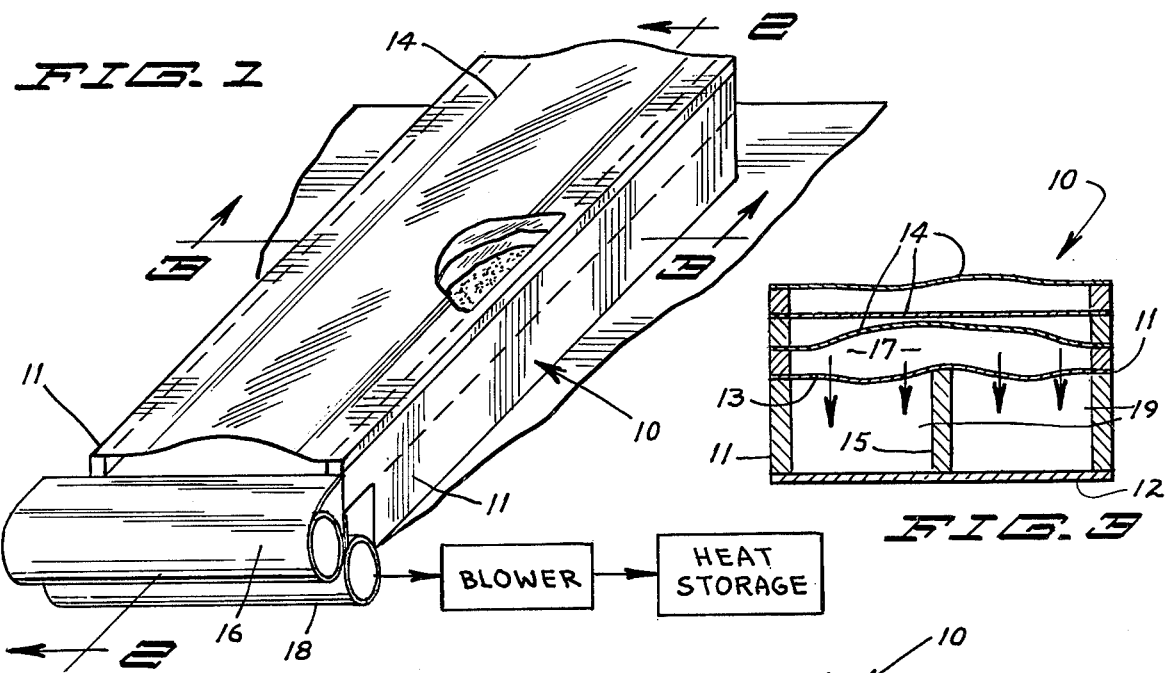
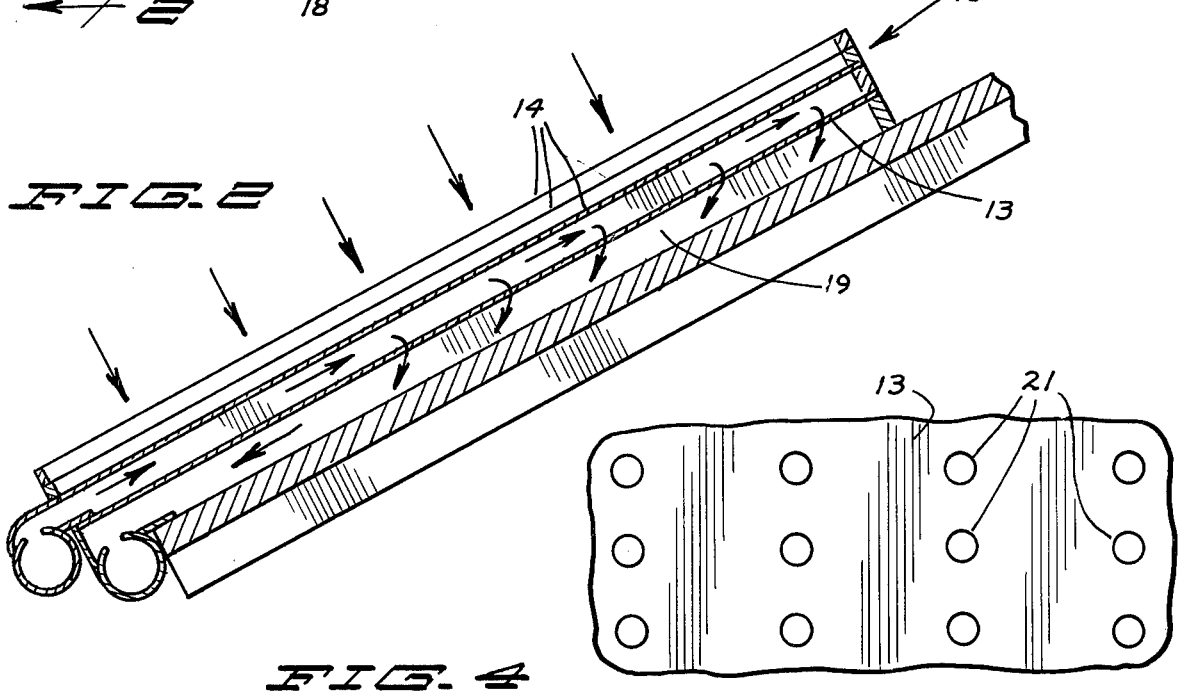
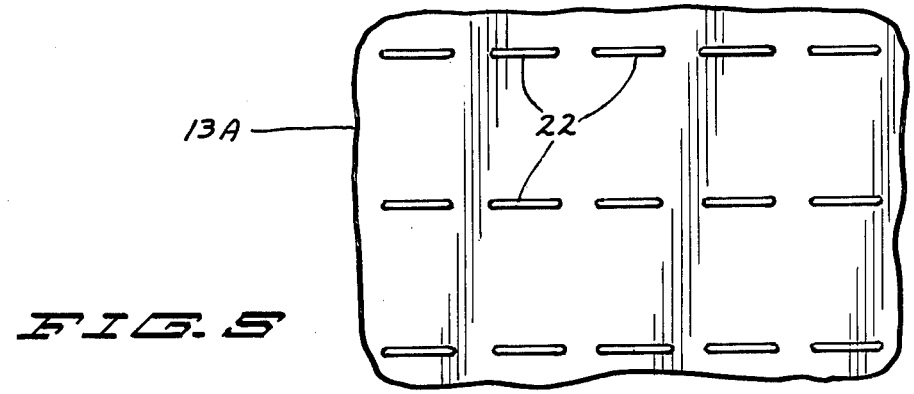

PERFORATED HEAT TRANSFER SHEET

CROSS REFERENCE TO RELATED APPLICATION

This application is a continuation-in-part of our co-pending application Ser. No. 590,052, filed June 25, 1975 for Perforated Heat Transfer Sheet, now abandoned.

BACKGROUND OF THE INVENTION

1. Field of the Invention

The present invention relates to a perforated sheet construction for transferring heat to a fluid in a unique heat transfer assembly.

2. Prior Art

Various heat transfer devices have been advanced in an attempt to provide for highly efficient heat transfer which is necessary in order to minimize power requirements. Efficient heat transfer devices find a substantial field of use in solar heat collectors.

Various porous media used in heat exchange devices has been shown in the prior art. For example a porous material is shown in U.S. Pat. No. 3,174,915, but this is a fibrous material blanket with a large number of fibers or strands woven into the blanket. A porous mat is also shown in U.S. Pat. No. 2,998,005 which has a mat again made up of fibrous materials.

However, maximum heat transfer, with low cost, flexibility and low power requirement, particularly for solar applications, is still sought after. Even relatively small improvements in heat transfer are valuable in the field of solar heating. The devices which have been advanced have drawbacks of not being as efficient as desired, or having a high cost, or both.

SUMMARY OF THE INVENTION

The present invention relates to a perforated heat transfer panel or sheet for use in transferring heat from a heat source to a fluid at a highly efficient rate and requiring low power consumption for moving the fluid. In the form as disclosed, a thin sheet of heat conducting material has apertures therethrough of small size. Air is considered as a primary fluid for transfer of heat, because of the advantages as will be more fully discussed, but other fluids can be used. The panel is heated from a heat source, which could be solar heat, electrical, or other sources of heat, and the fluid is passed over the sheet. The fluid passes through the apertures to a second side of the sheet, and from there is withdrawn to the place of heat storage or heat utilization. A circulating system can be set up to provide for circulation of the fluid across the heat transfer panel. The pressure drop of the fluid across the sheet is maintained at a sufficient level to insure that unwanted convection will not be set up adjacent the perforated sheet, but it is still low enough to keep power consumption for inducing fluid flow to a minimum.

The hole or aperture size used with the heat transfer panel is selected to be within preferred ranges for maximum utilization of the heat transfer characteristics, and with provision for heat transfer to the fluid without a significant temperature drop adjacent the edges of the openings to maintain a high rate of heat transfer.

In the form shown, the device can be made into foldable or rollable heat transfer panels, or collectors, which can be stored in limited space, can be easily manufactured and shipped and will provide for very efficient heat transfer. Additionally, the perforated sheets, when used in a collector assembly suppress unwanted free convection from one side of the sheet to the other.

BRIEF DESCRIPTION OF THE DRAWINGS

FIG. 1 is a fragmentary perspective view of a typical installation using a perforated heat transfer sheet made according to the present invention;

FIG. 2 is a sectional view taken as on line 2—2 in FIG. 1;

FIG. 3 is a sectional view taken as on line 3—3 in FIG. 1;

FIG. 4 is a fragmentary enlarged portion of a typical perforated heat transfer sheet made according to the present invention;

FIG. 5 is a fragmentary enlarged sectional view of a modified form of the apertures in the heat transfer sheet made according to the present invention.

DESCRIPTION OF THE PREFERRED EMBODIMENTS

Figure 6:
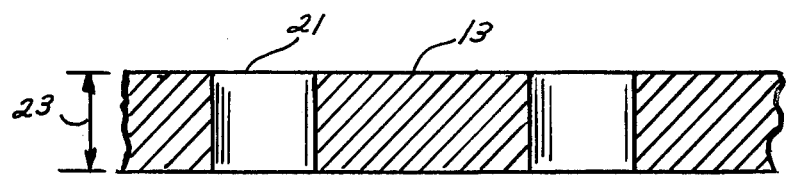
FIGS. 6A, 6B and 6C are enlarged cross sectional views of portions of heat transfer sheets showing edge configurations of the holes in the sheet.
Figure 6:
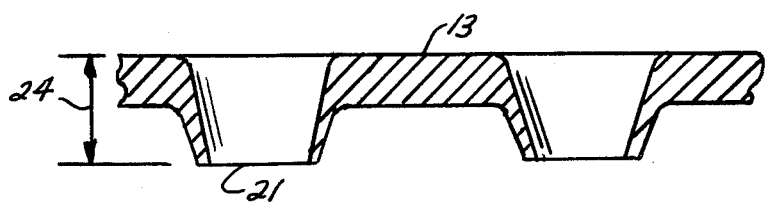
Figure 6:
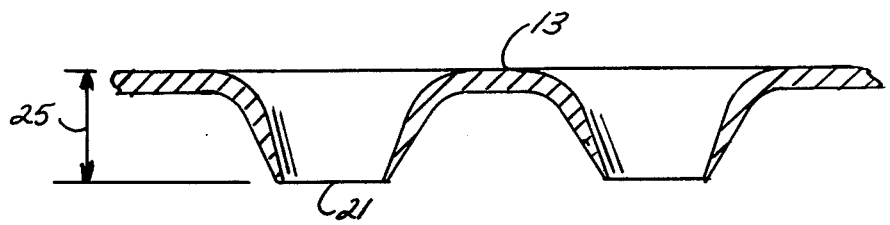

Referring first to FIG. 1, a typical installation utilizing a heat transfer sheet made according to the present invention is in connection with a solar heating panel or member, and it is to be remembered that it is shown merely as a preferred form, because the perforated transfer sheet itself can be utilized with other types of heaters. However, in the form shown, a solar heating assembly illustrated generally at 10 comprises a pair of longitudinally extending supports 11,11 that are joined together with a backing sheet 12. The longitudinal supports support an intermediate perforated heat transfer sheet made according to the present invention indicated generally at 13. A suitable cover sheet 14, comprising one or more radiant energy permeable materials can be used to cover the unit. As shown, three cover sheets 14 are provided, but in most cases two are sufficient, and when outside temperatures are not low, one is preferred.

The heat transfer sheet 13 may be supported with a suitable center support 15 in any desired manner, and even can be attached to or made integral with portions of the last cover sheet 14. In a typical installation, the perforated transfer sheet 13 separates the assembly 10 into two chambers 17 and 19. A fluid inlet duct indicated generally at 16 can be connected to an upper chamber 17, and a fluid outlet duct 18 is connected to a lower chamber 19. The lower chamber 19 is separated from the upper chamber by the perforated sheet 13. Chamber 19 has two sections as shown separated by support 15, but is considered to be a single chamber. The support 15 does not have to be continuous, and it can be perforated.

Means, such as a blower or pump, are provided for creating a pressure drop across the sheet 13 tending to move the fluid through ducts 16 and 18. The fluid will flow in through the inlet duct 16, into the chamber 17, across the sheet 13 and through the perforations in the sheet 13, into the chamber 19 and out through the outlet or return duct 18 back to the heat storage or heat utilization area.

By comparison with other methods of transferring heat from a heated panel to air or other fluid, some general observations are useful. Generally, it is preferred that excellent heat exchange be realized between the surface and the fluid. This means that much heat per unit area of the surface should be transferred with a minimum of temperature difference between the surface and the fluid. This is relatively easy with good heat transfer liquids such as water, though not always easy enough for some purposes. For certain applications such as collecting solar heat, water has serious offsetting disadvantages such as potential leakage, long term corrosion hazard, possibility of freezing, and therefore a much more expensive collector assembly as compared to collectors using gases (air, in particular).

When air is used as the heat transfer fluid, it is difficult to transfer heat at the desired rate without using a variety of means of enhancing the rate of heat transfer. One means is to use fins to increase the amount of surface area, but this adds cost and a large increase in area is needed if the temperature difference between the air and the collecting surface is to be as low as 20° or even 50° F. Another approach is to move the air very rapidly but this cannot be carried too far or it is found that too much horsepower is needed to move the air. Causing turbulent airflow helps but the problem remains. Use of fibers or porous material can be valuable, however the air velocity at the actual surface of such material will be very low unless much power is used, again resulting in either excessive power or excessive temperature difference, or both.

The present method is a particular arrangement of porosity which allows moderately high velocity over very short distances near each perforation, resulting in modest power requirements and good heat transfer, i.e., modest temperature difference between the air and the surface. One way to view the improvement is that a very thin boundary layer thickness is caused to exist but only in the immediate vicinity of each perforation. Thin boundary layers, as is well known, transfer heat well, but ordinarily imply high velocity and high power. Because only a small fraction of the collector's surface area, in our case, has this thin boundary layer, excessive power consumption does not take place. These same advantages apply if water or other fluid is used. For example, the method would be of interest if electric current was to be passed through the sheet to heat it, and a very high heat transfer rate to water was needed.

An additional advantage of the present method when used on solar heating applications is its small thermal mass compared to other existing collectors. For space heating, the minimum operating temperature of a flat plate collector is around 85° F whereas its average operating temperature might be 150° F. The energy required to raise the collector system from ambient temperature to the operating temperature is proportional to its thermal mass and is essentially lost each collection period. Also, during brief cloudy periods, a large thermal mass system loses more energy to ambient by conduction, convection, and radiation than a low thermal mass system since it "maintains" its temperature and hence driving force. The energy loss for large thermal mass systems can be minimized by provision of extra insulation but with the obvious disadvantage of additional cost.

Referring to FIG. 4. the perforated sheet 13 is shown in a first form of the invention as having round apertures 21 therein. These apertures 21 are selected to be of a preferred size in relation to the thickness of a sheet. Typically the perforated sheet 13 will comprise a thin aluminum foil sheet, for example, with the holes or apertures 21 punched through the sheet. In the case of a solar heater, one side of the sheet is provided with a dark coating for absorbing radiant energy so that the sheet itself will be heated. The diameter of the apertures 21 range from 0.002 inches to 0.020 inches or even 0.050 inches, with a spacing to produce 0.1% to 20% open area. The apertures are formed of substantially uniform size and approximately even distribution throughout the sheet. The edge surfaces which define the apertures in the thin aluminum foil sheet (which ranges generally in thickness of a few thousandths of an inch) plus the surface of the foil immediately adjacent such edges will be sufficient to transfer heat efficiently to the fluid passing through the apertures from chamber 17 to chamber 19, but will not cause a large temperature drop adjacent the edge surfaces. That is, there will be a temperature drop from the hottest parts of the metal to the edges of the holes usually much less than 0.01° F, and more importantly perhaps, the temperature drop through the boundary layer of the air which flows through the holes of no more than a few degrees Fahrenheit. These low temperature differences are the basic advantage over other means of transferring heat to air in similar applications.

The thickness of the aluminum foil or flexible sheet 13 need not be more than 0.1 to 10 times the aperture diameter, and thus a preferred relationship is set up so that the sheet is thin and the holes are small. Efficient heat transfer with low power consumption is achieved. Efficient heat transfer means a low quantity of power to move the fluid together with little temperature difference between the hot sheet of metal and the output fluid.

In FIG. 5, an alternate form of perforation comprising elongated slots indicated at 22 are shown in a sheet 13A.

The width of the slots 22 is generally in the same range at the low end of the diameters up to about ½ the maximum diameter of the holes 21, and the length can be as long as convenient, generally governed by mechanical construction considerations. The slots are oriented so the longitudinal bisecting lines are generally parallel to each other, and they are spaced apart at desired distances to obtain the desired open area. Other orientations would be acceptable. In In other words, the slots would be spaced to produce 0.1% to 10% open area preferably, and would range in width from 0.001 inch to generally 0.025 inch. The open area when using slots may be less than when using round holes.

The tiny holes or slits can easily be punched into aluminum foil so that the costs can be kept down. The forming of the solar heat panels of course can be done quite simply as well. The flexible sheets can also be used for electrical heat, and the fluid utilized need not be air, which is of primary importance, but also may be water or the like.

If a solar collector is set at an angle other than horizontal, the heated air will tend to rise in the chamber 19, and a sufficient pressure drop must be provided across the sheet to prevent unwanted internal circulation to be set up in the chamber 19. When the pressure drop through the openings in sheet 13 is sufficient the thermal convection is suppressed by the airflow.

The heat that is absorbed in the transfer sheet is conducted to the edge surface of the apertures in the sheet. These edge surfaces of course are quite narrow since a foil in the range of 0.001 to 0.015 (preferably under 0.010) inches in thickness may be used. The heat is transferred to the air or other fluid as it passes through the aperture, rather than relying on transfer at a boundary layer over the broad surface of the sheet. As stated, the thickness of the foil need not be more than 0.1 to ten times the hole diameter in order to have a negligible temperature drop within the metal. That is, when the heat is transferred to the air, the temperature of the edge surface of the apertures does not drop significantly. Furthermore, because this method causes the boundary layer thickness to be very small, for the fluid flowing through the small holes or slits, the temperature difference between the fluid and the surface of the apertures is kept small.

The use of aluminum foil having a polished surface presented to the sun, in the case of a solar heater, is important, because if radiation selective coatings are utilized, as are being worked on and developed, the reflective surface is important.

The heat transfer principles set out herein will apply regardless of the source of heat for the perforated sheet, although the preferred embodiment shown envisions its use in solar heating plants, because of the low horsepower requirement, efficiency in transferring heat and low cost. The transfer sheet is flexible, so that it can be rolled for storage or shipping.

Some of the basic problems in heat transfer include the transferring of the heat to a fluid from a heated surface with minimum pressure losses (horsepower losses) while achieving economy in manufacture, and in some cases such as the present case preventing unwanted heat convection within the heat transfer device.

The innovative features of this invention may be clarified by a description of the procedure for designing a perforated heat collector. Certain arbitrary choices are involved. One of these is the thickness of the sheet which is to be perforated. Aluminum is a good heat conductor and reasonably priced. It is a good choice as the sheet material. It is obvious that cost will be considerable if relatively thick material is used, such as 0.10 inch or more. Therefore it is desirable to use this thinnest sheet which appears structurally adequate, without degrading the performance of the collector, by providing inadequate heat transfer or creating large temperature variations in the aluminum sheet. 0.005 or 0.006 inch is structurally adequate if well supported, and especially if used in the hard-rolled condition. This thickness was chosen for examples which were analyzed and for models which were constructed and it was found that the heat transfer performance was excellent. Once a choice is made for the sheet thickness, the type of hole (round or slot-like) is selected. The next selection is the airflow rate. This can be decided on the basis of various considerations. The airflow may be selected to give the desired temperature rise from the input to the collector to the output. For example, at an altitude of 6200 ft., an airflow rate of 20.6 cu. ft. per minute through each square foot of collector sheet will give a temperature increase of 18.4° F. when the solar heat input is at a rate of 300 Btu/sq. ft./hr., a typical value. Having made this choice, it then remains to choose the hole size or slit size and the spacing (or the percentage of open area), so that the heat transfer from the collector sheet to the air is adequate, and for most purposes, so that unwanted internal convection does not occur.

The free or internal convection mentioned is from a tendency of air to flow through the apertures from the front (input chamber) to the back of the sheet (output chamber) near the lower end of the collector and flow from the output chamber to the input chamber through the holes in the sheet near the upper end of the collector and thus cause an unwanted circulation.

For the case of round holes, analysis for a typical case (300 Btu/hr. ft$^2$ input) showed that with aluminum foil 0.006 inch thick with holes 0.0066 inch in diameter and spaced in a square array with 5.6% open area, and with an airflow rate of 20.6 cu. ft./min./sq. ft., the sheet required only about 0.0001 hp/sq. ft. of area. This provided a pressure drop of 0.17 psf (pounds per square foot) and heated the air by 18.4° F. from the front or input side to the back or output side. If the input air is assumed to be at about 100° F., the temperature rise across the sheet causes a pressure differential due to higher air density on the front of the sheet and lower air density on the back because of the heating as the air passes through the openings. In order to suppress a tendency to cause free convection within the collector due to this pressure difference, it would be desirable that the pressure drop caused by the imposed airflow should be about ten times greater than the pressure differential caused by the temperature difference from front to back. For the above example, the vertical height (from end to end) which brings this about is 10 feet. If the vertical height were increased greatly, free convection would again become a problem. One correction would be to choose smaller holes, so as to increase the pressure drop from the front to the back of the sheet (and incidentally, increase the horsepower required per square foot). Another alternate would be to increase the airflow rate. This is effective, because it increases the pressure differential but at the same time, decreases the temperature differential. It is not desirable to use holes of much smaller diameter than 0.003 inch because of the difficulty of forming them. On the other hand, it is not desirable to use very much larger holes because the heat transfer from the aluminum sheet to the air is degraded rapidly as the hole size increases. In principle, so far as free convection alone is concerned, much smaller or much larger holes could be used if the percentage of open area is altered appropriately, so as to avoid the free convection problem. The theory for calculating the pressure drop and heat transfer is sufficiently well established for reasonably good approximations. A number of digital computer printouts confirmed that for the conditions just described, the hole size and spacing should not be greatly different from what was given. Experimental evaluations agreed reasonably with the theoretical calculations.

This example might represent the design for a house with a small heat demand in that 100 square feet of this collector requires an airflow of about 2,000 cubic feet per minute which is standard for most heating and cooling duct work. A somewhat larger collector of this design can be used efficiently provided it is physically located close to a storage or house distribution system. If it would be desired for a significantly different temperature change, vertical height, or the like, somewhat different results could be expected.

Slits are in some respects preferred over round holes, principally because they need not be so numerous and therefore can be easier to manufacture. In general, the procedure is about the same as for the analysis described for round holes. In a particular case, it was assumed that a typical radiant heat input from the sun would be 300 btu/hour/square foot, and it was desired to have a temperature rise of 35° F. It was desirable to have a vertical height of at least 10 feet from end to end. 0.005 inch thick aluminum was chosen. Analytical procedures are less well defined, but do provide useful estimates. In this case, a slit width of 0.004 inch was chosen. The slits were arranged end-to-end (about ⅛ inch between ends), with a spacing between rows of slits of 0.33 inches, a length for each slit of 0.380 inches, and an open area of 0.65%. This arrangement was fabricated and tested, resulting in a small adjustment in the dimensioning. The adjustment resulted in a slit width of 0.004 inch, spacing of rows of slits of 0.363 inches, length of 0.193 inches and open area of 0.56%, it was then found that the pressure drop was 0.52 lb/ft² for a flow of 6 cubic feet/minute/square foot of collector area. The temperature increase from front to back was 35° F. This allows a maximum vertical height of 13 feet to be used for the collector if free convection is to be insignificant.

Three to four hundred square feet of this collector would be compatible with standard heating and ventilating system designs while larger collectors would require attention to ducting requirements.

Preferably, slit widths should not be smaller than 0.001 inch or greater than 0.025 inch, and open area percentages should be between about 0.1% and 10%. The most preferred range is material under 0.010 inch in thickness, slits not substantially wider than the sheet thickness and an open area of between 0.2% and 2% of the sheet.

In the corresponding case of round holes, it is preferred to have hole diameters no smaller than 0.002 inch or greater than 0.05 inch and open area percentages should be between about 1% and 20%.

Intermediate aperture shapes between the extremes of round holes or long rectangular slits would also be usable.

FIGS. 6A, 6B and 6C show details of holes 21 or slits 22 in the sheet 13 or 13A of aluminum or other metal. What is illustrated are various forms of the edges of the openings for a cross section through holes 21 of FIG. 4. They could also represent cross-sectional views showing the edges of the slits 22 of FIG. 5.

In FIG. 6A a cleanly punched hole 21 is shown formed through a sheet having thickness represented at 23. In this case, dimension 23 also represents the axial length of hole 21. In FIG. 6B, rather than a cleanly punched hole, a pierced hole is illustrated. In this case, the dimension represented at 24 is the axial length of the hole 21, and the length of the hole is therefore greater than the thickness of sheet 13. FIG. 6C illustrated an even more distorted hole through sheet 13, such that the hole axial or flow direction length 25 is much greater than the thickness of sheet 13. The aperture flow direction length preferably should be one to ten times the thickness of the sheet.

The configurations illustrated in FIGS. 6A, 6B and 6C can be expected to give comparable heat transfer so long as the axial length of the holes represented at 23, 24 and 25 are approximately equal (even if the respective sheets vary in thickness), and the diameter (or width in case of a slit) of holes 21 and their spacings are approximately equal. Nevertheless, it is illustrated that the thickness of sheet 13 may be varied considerably without greatly altering the heat transfer from sheet 13 to the air if the holes are formed in the desired manner. The basic difference is that the temperature drop within sheet 13 increases somewhat as the thickness of the sheet decreases, other things being approximately constant. This temperature drop is negligible unless sheet 13 is very thin, much less than 0.001 inch, for solar heat collecting applications.

What is claimed is:

1. A solar heat collector assembly including a sheet of heat transfer material, radiant energy transmitting, cover means on one side of the sheet of material and spaced therefrom, means to support the cover means relative to said sheet of material to form a first chamber extending along a first side of said sheet of material, means forming a second chamber on a second side of said sheet opposite from the first chamber, said sheet of material being in the range of 0.001 to 0.015 inches thick and having apertures therethrough, no greater than 0.025 inches in smallest dimension, said apertures being spaced apart and providing passage of air from the first chamber to the second chamber, means to cause a forced airflow from said first to said second chambers, said apertures being spaced in said sheet of material so that a desired rate of forced airflow causes a sufficient pressure drop across said sheet of material to substantially suppress free convection.

2. The solar heat collector of claim 1 wherein said sheet of material is under 0.010 inches thick and the openings are slits in the range of 0.004 inches wide and provide an open area of less than 2% of the side surface area of said sheet of material.

3. A heat transfer assembly including a frame, means to support a perforated sheet of material having a substantial side surface area on said frame, and having a plurality of apertures therethrough, means to permit heating of said sheet, means to form a pair of separated chambers on opposite sides of said sheet and each opening to substantially the entire surface area of said perforated sheet, means to create a forced flow of air from one chamber to the other only through said perforations in said sheet, said means providing sufficient airflow in relation to the aperture size and spacing to suppress free convection in said heat transfer assembly.

4. The heat transfer assembly of claim 3 wherein said sheet is under 0.010 inches in thickness, and said apertures are slits not substantially greater in width than the thickness of the sheet and form between 0.2% and 2% open area in the perforated sheet.

5. The heat transfer assembly of claim 3 wherein said means providing airflow provides airflow that causes a pressure drop across said sheet substantially ten times the pressure differential between said chambers occasioned by the temperature difference in said chambers.

6. A heat transfer assembly including a sheet of heat conducting material adapted to be heated; said sheet of material having apertures defined therethrough, said apertures having a minimum dimension across at least one transverse width axis that is in the range of one/tenth to ten times the thickness of said sheet, said apertures being substantially uniformly spaced to produce 0.1% to 20% open area in said sheet of material, means mounting said sheet of material and defining chambers for fluid flow on each of the opposite sides of said sheet and means connected to at least one chamber to provide a fluid pressure drop across said sheet of material to force fluid to flow through said apertures at a desired rate.

7. The combination as specified in claim 6 wherein said apertures are holes having generally uniform diameters, and the holes range in size from 0.002 inch to 0.020 inch a diameter.

8. The heat transfer assembly of claim 6 wherein said sheet of material is aluminum and is in the range of 0.001 inch to 0.015 inch in thickness.

9. The heat transfer assembly of claim 6 wherein said apertures have a minimum dimension across at least one transverse width axis that is in the range of one/tenth to ten times the aperture flow length, said aperture flow length being measured generally perpendicular to the sheet and in the fluid flow direction of said apertures, said apertures being pierced and deformed into a shape such that the aperture flow length is in the range of one to ten times the thickness of the sheet.

10. The heat transfer assembly of claim 8 including means supporting a radiant energy transmitting, cover means on one side of the sheet of material in spaced relation thereto to form one of said chambers, said sheet of aluminum being under 0.010 inches thick and said apertures comprising slits in the range of 0.004 inches wide and provide an open area of less than 2% of the side area of the sheet of material.

11. A heat transfer assembly including a frame, means to support a perforated sheet of heat conducting material such as aluminum having a substantial side surface area on said frame, said sheet having a plurality of perforations therethrough and being generally evenly spaced across the entire sheet, means to permit heating of said sheet, means to form at least one chamber on one of the opposite sides of said sheet opening to substantially the entire active surface area of said perforated sheet, said chamber being fluidly separated from the other side of the sheet except for the perforations in said sheet, said other side of said sheet being open to a desired location, means to create a forced flow of fluid to said one chamber from the other side of said sheet only through said perforations in said sheet, said sheet being under 0.015 inches in thickness, and said perforations comprising slits not substantially greater in width than the thickness of the sheet and which form between 0.1% and 10% open area in the perforated sheet.

12. A heat transfer assembly including a sheet of heat conducting material adapted to be heated and having a desired thickness, said sheet of material having apertures defined therethrough, said apertures having a minimum dimension across at least one transverse width axis that is in the range of one/tenth to ten times the thickness of said sheet, said apertures being substantially uniformly spaced to produce 0.1% to 20% open area in said sheet of material, means mounting said sheet of material and defining at least one chamber for fluid flow open to one of the sides of said sheet, the opposite side of said sheet opening to a desired location, and means connected to said one chamber to provide a fluid pressure drop across said sheet of material to force fluid to flow through said apertures at a desired rate.

* * * * *